United States Patent
Kishi et al.

(10) Patent No.: US 8,926,078 B2
(45) Date of Patent: *Jan. 6, 2015

(54) INK, INK CARTRIDGE, INK-JET RECORDING METHOD, AND INK SET

(75) Inventors: Hiromitsu Kishi, Kawasaki (JP); Fumiaki Fujioka, Kawasaki (JP); Hirofumi Ichinose, Tokyo (JP); Rie Takekoshi, Kawasaki (JP); Takumi Kaneko, Tokyo (JP); Yumi Kamimura, Tokyo (JP); Kazuki Narumi, Kawasaki (JP); Akihiro Kakinuma, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 459 days.

This patent is subject to a terminal disclaimer.

(21) Appl. No.: 13/015,110

(22) Filed: Jan. 27, 2011

(65) Prior Publication Data

US 2011/0189396 A1 Aug. 4, 2011

(30) Foreign Application Priority Data

Jan. 29, 2010 (JP) ................................ 2010-017789

(51) Int. Cl.
| | |
|---|---|
| *B41J 2/01* | (2006.01) |
| *B05D 5/00* | (2006.01) |
| *C09D 11/322* | (2014.01) |
| *C09D 11/324* | (2014.01) |
| *B41J 2/21* | (2006.01) |
| *C09D 11/02* | (2014.01) |

(52) U.S. Cl.
CPC ................ *B05D 5/00* (2013.01); *C09D 11/322* (2013.01); *C09D 11/324* (2013.01); *B41J 2/2132* (2013.01); *B41J 2/2107* (2013.01); *C09D 11/02* (2013.01)
USPC ........................................... 347/100; 347/95

(58) Field of Classification Search
CPC .............. B41J 2/01; B41J 2/21; B41J 2/2017; B41J 2/2132; C09D 11/32; C09D 11/02; C09D 11/30; C09D 11/322; C09D 11/324; C09D 11/40; B05D 5/00
USPC ......... 347/95–100, 19, 20, 21, 28; 106/31.13, 106/31.27, 31.6; 523/160, 161
See application file for complete search history.

(56) References Cited

U.S. PATENT DOCUMENTS

| | | | | |
|---|---|---|---|---|
| 6,618,050 | B1 * | 9/2003 | Rupieper et al. | 345/426 |
| 6,731,277 | B2 * | 5/2004 | Rupieper et al. | 345/419 |
| 6,987,567 | B2 * | 1/2006 | Takahashi et al. | 356/405 |
| 8,027,058 | B2 * | 9/2011 | Jinno | 358/1.9 |
| 8,115,827 | B2 * | 2/2012 | Matsuura | 348/223.1 |
| 2005/0237553 | A1 * | 10/2005 | Takahashi et al. | 358/1.9 |
| 2006/0162614 | A1 | 7/2006 | Koganehira | |
| 2006/0170938 | A1 * | 8/2006 | Ibarluzea et al. | 358/1.9 |
| 2007/0243314 | A1 * | 10/2007 | Jinno | 427/8 |
| 2007/0291311 | A1 * | 12/2007 | Yano et al. | 358/2.1 |
| 2008/0306167 | A1 * | 12/2008 | Morvan | 514/769 |
| 2010/0118348 | A1 * | 5/2010 | Jinno | 358/3.24 |
| 2011/0187787 | A1 * | 8/2011 | Fujioka et al. | 347/20 |
| 2012/0050762 | A1 * | 3/2012 | Konno et al. | 358/1.9 |

FOREIGN PATENT DOCUMENTS

| | | |
|---|---|---|
| JP | 2000-351931 A | 12/2000 |
| JP | 2006-063101 A | 3/2006 |
| JP | 2006-206701 A | 8/2006 |
| JP | 2008-143135 A | 6/2008 |

* cited by examiner

*Primary Examiner* — Matthew Luu
*Assistant Examiner* — Rut Patel
(74) *Attorney, Agent, or Firm* — Canon U.S.A., Inc. IP Division

(57) ABSTRACT

An ink containing a plurality of coloring materials having different hues, wherein the bronze value B, which is calculated from tristimulus values of reflected light, of illumination in the direction of an angle of 45 degrees to a normal to the image, in the direction of specular reflection and tristimulus values of illumination light under the same condition of the illumination by using Formula 1, with respect to a predetermined recorded image recorded by the above-described ink is 2.0 or less.

7 Claims, No Drawings

INK, INK CARTRIDGE, INK-JET RECORDING METHOD, AND INK SET

BACKGROUND OF THE INVENTION

1. Field of the Invention

The present invention relates to an ink, an ink cartridge, an ink-jet recording method, and an ink set.

2. Description of the Related Art

In recent years, ink-jet recording technologies have been used in a wide range of fields, and an ink usable in various uses has been desired. Pigment inks, in which pigments are used as coloring materials, have been utilized especially in applications where the fastness property is taken very seriously. However, the pigments have a specific issue that scattering of light occurs easily because the pigments are present as particles. In particular, in the case where a recording medium is glossy paper, there is an issue that a so-called bronze phenomenon occurs, in which an image recorded on the glossy paper glares in such a manner as metallic luster, or reflected light takes on a color different from the color intrinsic to the pigment depending on the observation angle of the recorded material.

In order to solve the above-described issues, various proposals have been made previously. For example, it is disclosed that the bronze phenomenon is suppressed by using a phthalocyanine pigment and a polymer emulsion in combination (refer to Japanese Patent Laid-Open No. 2000-351931). The bronze phenomenon is also recognized remarkably in the case where a monochrome image is recorded by using an achromatic ink and, therefore, suppression thereof has been desired strongly. Regarding this problem, for example, an attempt to include carbon black and another coloring material to reduce the bronze phenomenon and reduce the property of taking on yellow and the property of taking on red has been proposed (refer to Japanese Patent Laid-Open No. 2006-206701). In order to suppress the property of taking on yellow of carbon black, there is a proposal related to an ink containing carbon black and another coloring material (refer to Japanese Patent Laid-Open No. 2006-063101). Furthermore, there is a proposal related to an apparatus in which the bronze phenomenon of an image formed by superposing a plurality of inks can be suppressed through image processing to perform color separation in such a way as to minimize a bronze value (refer to Japanese Patent Laid-Open No. 2008-143135).

SUMMARY OF THE INVENTION

Aspects of the present invention provide an ink capable of recording an image while bronze phenomenon is suppressed sufficiently and an ink cartridge and an ink-jet recording method by using the above-described ink. Aspects of the present invention further provide an ink set exhibiting excellent blackness and being capable of recording a favorable image over a wide color tone from a warm tone to a cool tone.

An ink according to aspects of the present invention contains a plurality of coloring materials having different hues, wherein the bronze value B, which is calculated by Formula 1 described below, with respect to a predetermined recorded image recorded by the above-described ink is 2.0 or less.

$$a_{45}^* = 500\left[f\left(\frac{Xx_{45}}{Xs_{45}}\right) - f\left(\frac{Yx_{45}}{Ys_{45}}\right)\right], \quad \text{Formula 1}$$

-continued
$$b_{45}^* = 200\left[f\left(\frac{Yx_{45}}{Ys_{45}}\right) - f\left(\frac{Zx_{45}}{Zs_{45}}\right)\right]$$

$$B = (a_{45}^{*2} + b_{45}^{*2})^{\frac{1}{2}}$$

$Xx_{45}$, $Yx_{45}$, and $Zx_{45}$ are tristimulus values of reflected light of illumination in the direction of specular reflection. The illumination is in the direction of an angle of 45 degrees to a normal to the image. $Xs_{45}$, $Ys_{45}$, and $Zs_{45}$ are tristimulus values of illumination light under the same condition of the illumination. These tristimulus values satisfy the following formulas.

$$f\left(\frac{Xx_{45}}{Xs_{45}}\right) = \left(\frac{Xx_{45}}{Xs_{45}}\right)^{\frac{1}{3}} \text{ where } \frac{Xx_{45}}{Xs_{45}} > 0.008856$$

$$f\left(\frac{Xx_{45}}{Xs_{45}}\right) = 7.78\frac{Xx_{45}}{Xs_{45}} + \frac{16}{116} \text{ where } \frac{Xx_{45}}{Xs_{45}} \leq 0.008856$$

$$f\left(\frac{Yx_{45}}{Ys_{45}}\right) = \left(\frac{Yx_{45}}{Ys_{45}}\right)^{\frac{1}{3}} \text{ where } \frac{Yx_{45}}{Ys_{45}} > 0.008856$$

$$f\left(\frac{Yx_{45}}{Ys_{45}}\right) = 7.78\frac{Yx_{45}}{Ys_{45}} + \frac{16}{116} \text{ where } \frac{Yx_{45}}{Ys_{45}} \leq 0.008856$$

$$f\left(\frac{Zx_{45}}{Zs_{45}}\right) = \left(\frac{Zx_{45}}{Zs_{45}}\right)^{\frac{1}{3}} \text{ where } \frac{Zx_{45}}{Zs_{45}} > 0.008856$$

$$f\left(\frac{Zx_{45}}{Zs_{45}}\right) = 7.78\frac{Zx_{45}}{Zs_{45}} + \frac{16}{116} \text{ where } \frac{Zx_{45}}{Zs_{45}} \leq 0.008856$$

According to an aspect of the present invention, an ink capable of recording an image while bronze phenomenon is suppressed sufficiently and an ink cartridge and an ink-jet recording method by using the above-described ink can be provided. Furthermore, according to another aspect of the present invention, an ink set exhibiting excellent blackness and being capable of recording a favorable image over a wide color tone from a warm tone to a cool tone can be provided.

Further features of the present invention will become apparent from the following description of exemplary embodiments.

DESCRIPTION OF THE EMBODIMENTS

The present invention will be described below in more detail with reference to embodiments.

According to the examination of the present inventors, a desired level of suppression of the bronze phenomenon was not satisfied by using any one of the above-described techniques in the related art. For example, according to the technology described in Japanese Patent Laid-Open No. 2000-351931, the bronze phenomenon is suppressed to some extent by the polymer emulsion, although the level is insufficient. Japanese Patent Laid-Open No. 2006-206701 states that neutral black exhibiting excellent blackness can be output with respect to both the color on the basis of usual unidirectional illumination calorimetry (2-degree calorimetric value) and the color on the basis of a visual feeling (20-degree calorimetric value). For details, it is stated that the above-described neutral black can be output by including carbon black, a phthalocyanine pigment, and a benzimidazolone pigment in an ink. However, in the technology described in Japanese Patent Laid-Open No. 2006-206701, the difference between a* of 2-degree calorimetric value and a* of 20-degree calorimetric value (Δa*) is specified to be within a predetermined value. This refers to that even when each value of a* is large (reddish black), the specification is satisfied if they are close values. Therefore, it is not said that the black is apparently really neutral. According to the examination of the present inventors, it was made clear that the level of the bronze phenomenon of the ink described in the example was actually insufficient as compared with the level desired by the present inventors. Regarding the technology described in Japanese Patent Laid-Open No. 2006-063101, it was made clear that the color of the image by the ink containing the carbon black became close to neutral black, but it was not said that the bronze phenomenon was suppressed. In this regard, the property of taking on yellow and the property of taking on red of carbon black refer to a phenomenon in which the color of diffuse reflected light of an image recorded by using carbon black takes on yellow or red. Furthermore, the technology described in Japanese Patent Laid-Open No. 2008-143135 is to suppress the bronze phenomenon in the image recorded by superposing a plurality of inks, and suppression of the bronze phenomenon in the image recorded by using some one type of ink is not noted.

Initially, the bronze value specified according to aspects of the present invention will be described in detail. As described above, the bronze phenomenon refers to a phenomenon in which the reflected light is observed to take on a color different from the color intrinsic to the pigment. The present inventors considered that expression of the color of the bronze phenomenon by an index was important to suppress the bronze phenomenon. Then, it was found that the color of specular reflected light relative to incident light from the 45-degree direction with respect to an image was expressed by an index. This is based on the fact that the bronze phenomenon appears most remarkably with respect to the specular reflected light relative to incident light from the 45-degree direction. In this regard, the specular reflected light results from perfect reflection of light by a mirror or the like, and the incident angle and the reflection angle of the light are the same angle with respect to a reflection surface. That is, the specular reflected light of the light incident from the 45-degree direction is light reflected at an equal angle of 45 degrees with respect to the reflection surface. Meanwhile, as for the technique to express the color by an index, in general, the calculation technique in the CIELab colorimetric system recommended by Commission Internationale de l' Eclairage is used. Regarding aspects of the present invention, as for the evaluation index of the color of the bronze phenomenon, a new technique was found, in which the value of color, that is, the "bronze value" calculated on the basis of only the specular reflected light relative to the incident light from the 45-degree direction and on the basis of the calculation technique in the CIELab colorimetric system was specified with respect to one ink. The detailed calculation method of the bronze value will be described later. Consequently, the color of the bronze phenomenon can be calculated appropriately, and the bronze phenomenon can be controlled by controlling the bronze value. Therefore, the bronze value is examined and controlled in the stage of ink design and, thereby, the bronze phenomenon in the image formed by the ink concerned can be suppressed.

Here, terms used according to aspects of the present invention are defined. The term "predetermined recorded image" refers to a solid image recorded on ink-jet glossy paper, in which a porous ink receiving layer containing an inorganic pigment and a binder is provided on a gas-permeable substrate (paper or the like), with a recording duty of 100% or 200% by using one ink. The above-described glossy paper may be a recording medium having surface glossiness within a common range. For example, glossy paper having a 20-degree gloss value measured under the condition of the incident angle of 20 degrees and the reflection angle of 20 degrees of preferably 10.0 or more, and 50.0 or less can be used. Furthermore, glossy paper having a 20-degree gloss value of more preferably 30.0 or more, and 50.0 or less can be used. The term "recorded image with a recording duty of 100%" refers to an image provided with one droplet of ink having a mass of 4.5 ng per droplet in a unit region of $\frac{1}{1,200}$ inch×$\frac{1}{1,200}$ inch where the resolution is 1,200 dpi×1,200 dpi. An image provided with two droplets under the same condition is defined as a "recorded image with a recording duty of 200%".

According to aspects of the present invention, the term "bronze value B" refers to a value calculated with reference to the color calculation technique in the CIELab calorimetric system on the basis of the measurement performed in a manner described below. Initially, the measurement is performed by using a goniophotometer under the condition of the light source of D65, the view angle of 2 degrees, the incident angle of 45 degrees, the reflection angle of 45 degrees, and the flapping angle of 0 degrees and, thereby, calculates the tristimulus values of the reflected light and the illumination light. In the examples described later, "Gonio-Spectrophotometric Color measurement system" (Model GCMS-3B; produced by MURAKAMI COLOR RESEARCH LABORATORY) was used. The tristimulus value of the reflected light is determined from the spectral intensity of the reflected light obtained in the measurement of the "predetermined recorded image" defined as described above with the goniophotometer under the above-described condition. The tristimulus value of the illumination light is determined from the spectral intensity of the illumination light obtained in the measurement of barium sulfate, which is also used as a white correction plate of a goniophotometer, under the above-described condition with the goniophotometer. Then, the individual tristimulus values are used and, thereby, the "bronze value B" of each of recorded images with recording duties of 100% and 200% is calculated on the basis of Formula 1 described below.

$$a_{45}^* = 500\left[f\left(\frac{Xx_{45}}{Xs_{45}}\right) - f\left(\frac{Yx_{45}}{Ys_{45}}\right)\right],$$

$$b_{45}^* = 200\left[f\left(\frac{Yx_{45}}{Ys_{45}}\right) - f\left(\frac{Zx_{45}}{Zs_{45}}\right)\right]$$

$$B = (a_{45}^{*2} + b_{45}^{*2})^{\frac{1}{2}}$$

Formula 1

($Xx_{45}$, $Yx_{45}$, and $Zx_{45}$ are tristimulus values of reflected light of illumination in the direction of specular reflection. The illumination is in the direction of an angle of 45 degrees to a normal to the image. $Xs_{45}$, $Ys_{45}$, and $Zs_{45}$ are tristimulus values of illumination light under the same condition of the illumination. These tristimulus values satisfy the following formulas. Regarding the color calculation technique in the CIELab calorimetric system, values of a* and b* can be approximately calculated by substituting the following formulas into Formula 1.)

$$f\left(\frac{Xx_{45}}{Xs_{45}}\right) = \left(\frac{Xx_{45}}{Xs_{45}}\right)^{\frac{1}{3}} \text{ where } \frac{Xx_{45}}{Xs_{45}} > 0.008856$$

$$f\left(\frac{Xx_{45}}{Xs_{45}}\right) = 7.78\frac{Xx_{45}}{Xs_{45}} + \frac{16}{116} \text{ where } \frac{Xx_{45}}{Xs_{45}} \leq 0.008856$$

-continued $$f\left(\frac{Yx_{45}}{Ys_{45}}\right) = \left(\frac{Yx_{45}}{Ys_{45}}\right)^{\frac{1}{3}} \text{ where } \frac{Yx_{45}}{Ys_{45}} > 0.008856$$

$$f\left(\frac{Yx_{45}}{Ys_{45}}\right) = 7.78\frac{Yx_{45}}{Ys_{45}} + \frac{16}{116} \text{ where } \frac{Yx_{45}}{Ys_{45}} \le 0.008856$$

$$f\left(\frac{Zx_{45}}{Zs_{45}}\right) = \left(\frac{Zx_{45}}{Zs_{45}}\right)^{\frac{1}{3}} \text{ where } \frac{Zx_{45}}{Zs_{45}} > 0.008856$$

$$f\left(\frac{Zx_{45}}{Zs_{45}}\right) = 7.78\frac{Zx_{45}}{Zs_{45}} + \frac{16}{116} \text{ where } \frac{Zx_{45}}{Zs_{45}} \le 0.008856$$

The term "control ink" according to aspects of the present invention refers to an ink formed in a manner similar to the above-described ink except that one of the "plurality of coloring materials having different hues" in the ink according to aspects of the present invention is contained and adjustment is performed with water. That is, the number of the control inks is equal to the number of coloring materials contained in the ink according to aspects of the present invention. The constituents of the control ink is the same as the constituents of the ink according to aspects of the present invention except the coloring material. The contents of the individual constituents of the control ink are the same as those in the ink according to aspects of the present invention except that the water content is adjusted in accordance with the contents of coloring materials not contained in the control ink. For example, the case where the ink according to aspects of the present invention contains two types of coloring materials (A and B) having different hues is as described below. In the case where the ink according to aspects of the present invention contains a percent by mass of coloring material A, b percent by mass of coloring material B, c percent by mass of water, and d percent by mass of other constituents, the "control inks" refer to the following two types of inks. They are an ink containing a percent by mass of coloring material A, c+b percent by mass of water, and d percent by mass of other constituents and an ink containing b percent by mass of coloring material B, c+a percent by mass of water, and d percent by mass of other constituents. Likewise, in the case where the ink according to aspects of the present invention contains three or more types of coloring materials having different hues, the number of the "control inks" present is equal to the number of coloring materials.

The "saturation value C" according to aspects of the present invention refers to a value calculated with reference to the color calculation technique in the CIELab calorimetric system on the basis of the measurement performed in the following manner in conformity with JIS Z 8729. Initially, the measurement is performed by using a goniophotometer under the condition of the light source of D65, the view angle of 2 degrees, the incident angle of 45 degrees, the reflection angle of 0 degrees, and the flapping angle of 0 degrees. In the examples described later, "Gonio-Spectrophotometric Color measurement system" (Model GCMS-3B; produced by MURAKAMI COLOR RESEARCH LABORATORY) was used. The tristimulus values of the reflected light and the illumination light are calculated in a manner similar to the method for measuring the above-described bronze value B. Then, the individual tristimulus values are used and, thereby, the "saturation values C" of the individual recorded images with recording duties of 100% and 200% are calculated on the basis of Formula 2 described below.

$$a_0^* = 500\left[f\left(\frac{Xx_0}{Xs_0}\right) - f\left(\frac{Yx_0}{Ys_0}\right)\right], \quad \text{Formula 2}$$

$$b_0^* = 200\left[f\left(\frac{Yx_0}{Ys_0}\right) - f\left(\frac{Zx_0}{Zs_0}\right)\right]$$

$$C = (a_0^{*2} + b_0^{*2})^{\frac{1}{2}}$$

($Xx_0$, $Yx_0$, and $Zx_0$ are tristimulus values of reflected light of illumination in the direction of a normal to the image. The illumination is in the direction of an angle of 45 degrees to the normal. $Xs_0$, $Ys_0$, and $Zs_0$ are tristimulus values of illumination light under the same condition of the illumination. These tristimulus values satisfy the following formulas. Regarding the color calculation technique in the CIELab calorimetric system, the values of a* and b* can be approximately calculated by substituting the following formulas into Formula 2.)

$$f\left(\frac{Xx_0}{Xs_0}\right) = \left(\frac{Xx_0}{Xs_0}\right)^{\frac{1}{3}} \text{ where } \frac{Xx_0}{Xs_0} > 0.008856$$

$$f\left(\frac{Xx_0}{Xs_0}\right) = 7.78\frac{Xx_0}{Xs_0} + \frac{16}{116} \text{ where } \frac{Xx_0}{Xs_0} \le 0.008856$$

$$f\left(\frac{Yx_0}{Ys_0}\right) = \left(\frac{Yx_0}{Ys_0}\right)^{\frac{1}{3}} \text{ where } \frac{Yx_0}{Ys_0} > 0.008856$$

$$f\left(\frac{Yx_0}{Ys_0}\right) = 7.78\frac{Yx_0}{Ys_0} + \frac{16}{116} \text{ where } \frac{Yx_0}{Ys_0} \le 0.008856$$

$$f\left(\frac{Zx_0}{Zs_0}\right) = \left(\frac{Zx_0}{Zs_0}\right)^{\frac{1}{3}} \text{ where } \frac{Zx_0}{Zs_0} > 0.008856$$

$$f\left(\frac{Zx_0}{Zs_0}\right) = 7.78\frac{Zx_0}{Zs_0} + \frac{16}{116} \text{ where } \frac{Zx_0}{Zs_0} \le 0.008856$$

The technical idea according to aspects of the present invention is to whiten a plurality of bronze light in accordance with the plurality of coloring materials having different hues through additive mixture in order that a color of bronze light of the plurality of coloring materials as a whole is not recognized easily. That is, the plurality of coloring materials having different hues is contained in the ink in such a way that the above-described bronze value B becomes 2.0 or less. Consequently, the effect according to aspects of the present invention can be achieved, so that an image is obtained while the bronze phenomenon is suppressed. It is necessary that both bronze values B of the recorded images with the recording duties of 100% and 200% become 2.0 or less.

Furthermore, in the case where the ink according to aspects of the present invention is a black ink, the ink becomes achromatic by specifying the above-described saturation value C to be 2.0 or less and, thereby, a black ink ensuring the compatibility between suppression of bronze phenomenon (color of specular reflected light) and color (color of diffuse reflected light) and exhibiting really excellent blackness can be realized. In this regard, both saturation values C of the recorded images with the recording duties of 100% and 200% become preferably 2.0 or less.

Among the plurality of coloring materials which have different hues and which constitute the ink according to aspects of the present invention, in the case where the major coloring material is carbon black, even a black ink, which takes on yellow or red because of the bronze phenomenon easily, a black ink exhibiting really excellent blackness can be realized. The effect according to aspects of the present invention achieved by the above-described configuration is at a level far beyond what can be reached in the case where a polymer emulsion or the like is added to an ink or tone adjustment is simply performed for the purpose of reducing the property of taking on yellow and the property of taking on red of the carbon black, as in the related art.

Regarding the control ink in accordance with the ink according to aspects of the present invention, the value calculated in a manner similar to the method for calculating the above-described bronze value B is assumed to be a bronze value B'. At this time, even in the case where a control ink having a bronze value B' exceeds 2.0 is present and, therefore, it seems to be disadvantageous for suppression of the bronze phenomenon, the effect according to aspects of the present invention is obtained insofar as the bronze value B is 2.0 or less. That is, the bronze phenomenon can be suppressed even in the case where the bronze value B of at least one control ink selected from the control inks in accordance with the ink according to aspects of the present invention exceeds 2.0. The very thing that has achieved this is the technical idea according to aspects of the present invention, in which a color of bronze light of the plurality of coloring materials as a whole is allowed to become not recognized easily by whitening of a plurality of bronze light in accordance with the plurality of coloring materials having different hues through additive mixture rather than by suppression of generation in itself of the bronze light.

Ink

The individual components constituting the ink according to aspects of the present invention will be described below.

Coloring Material

As for the plurality of coloring materials which have different hues and which constitute the ink according to aspects of the present invention, pigments and dyes are mentioned, and any coloring material, which has been known as a coloring material usable for an ink, can be used. As for combinations of the plurality of coloring materials which have different hues and which constitute the ink according to aspects of the present invention, any combination can be employed insofar as it is satisfied that the above-described bronze value B is 2.0 or less. Most of all, a combination of coloring materials can be selected in such a way that regarding the individual control inks in accordance with the coloring materials, the individual vectors linking the origin point (0, 0) and the point $(a^*_{45}, b^*_{45})$ form an angle of 90 degrees or more with one another, where $a^*_{45}$ and $b^*_{45}$ are calculated in a manner similar to the calculation technique of the above-described bronze value B'. Whitening of a plurality of bronze light through additive mixture is facilitated by combining the coloring materials satisfying the above-described requirements, and the bronze phenomenon can be suppressed effectively. In the case where the ink according to aspects of the present invention is configured to contain n types (n represents an integer of 2 or more) of coloring materials, in particular, the angle formed by the sum of vectors of any n−1 types of control inks and the vector of the remainder one type of control ink can satisfy the above-described relationship.

According to aspects of the present invention, the total content (percent by mass) of the coloring materials in the ink is preferably 2.0 percent by mass or more, and 10.0 percent by mass or less with reference to the total mass of the ink. If the total content of the coloring materials is less than 2.0 percent by mass, sufficient color developability is not obtained in some cases. In particular, in the case where the ink according to aspects of the present invention is a black ink, a monochromatic image excellent in a blackness of a solid image and gradation expression of a shadow portion is not obtained in some cases.

On the other hand, if the total content of the coloring materials exceeds 10.0 percent by mass, the reliability, e.g., ejection stability of ink-jet method recording head, of the ink is not obtained sufficiently in some cases. The mass ratio of the content (hereafter referred to as a major content) of the coloring material having the largest content (hereafter referred to as a major coloring material) in the ink to the total content of coloring materials other than the major coloring material is preferably within the range of 7:1 to 1:1.

The coloring material used for the ink according to aspects of the present invention can be a pigment from the viewpoint of the lightfastness and the like. In particular, among the plurality of coloring materials which have different hues and which constitute the ink according to aspects of the present invention, the major coloring material can be a pigment. According to aspects of the present invention, the "major coloring material" refers to a coloring material having the largest content in the ink among the plurality of coloring materials. Furthermore, all of the plurality of coloring materials, which have different hues and which constitute the ink according to aspects of the present invention, can be pigments.

Pigment

As for the pigment usable for the ink according to aspects of the present invention, inorganic pigments and organic pigments are mentioned. Specifically, the following pigments can be used.

As for the inorganic pigment, carbon black, e.g., furnace black, lamp black, acetylene black, channel black, and thermal black, can be used. Specific examples can include commercially available pigments, e.g., Raven: 1170, 1190ULTRA-II, 1200, 1250, 1255, 1500, 2000, 3500, 5000ULTRA, 5250, 5750, and 7000 (these items are produced by Columbian Chemicals Company), Black Pearls L, REGAL: 330R, 400R, 660R, MOGUL L, MONARCH: 700, 800, 880, 900, 1000, 1100, 1300, 1400, and 2000, and VULCAN XC-72R (these items are produced by Cabot Corporation), Color Black: FW1, FW2, FW2V, FW18, FW200, S150, S160, and S170, Printex: 35, U, V, 140U, and 140V, and Special Black: 4, 4A, 5, and 6 (these items are produced by Degussa), and No. 25, No. 33, No. 40, No. 47, No. 52, No. 900, No. 2300, MCF-88, MA600, MA7, MA8, and MA100 (these items are produced by MITSUBISHI CHEMICAL CORPORATION). Furthermore, carbon black specially newly prepared for aspects of the present invention can also be used. However, the present invention is not limited to them, and any previously known carbon black can be used. Moreover, the inorganic pigment is not limited to the carbon black, and for example, magnetic fine particles of magnetite, ferrite, and the like and titanium black may be used.

Specific examples of organic pigments include water-insoluble azo pigments, e.g., Toluidine Red, Toluidine Maroon, Hansa Yellow, Benzidine Yellow, and Pyrazolone Red, water-soluble azo pigments, e.g., Lithol Red, Helio Bordeaux, Pigment Scarlet, and Permanent Red 2B, derivatives from vat dyes, e.g., alizarin, indanthrone, and thioindigo maroon, phthalocyanine based pigments, e.g., Phthalocyanine Blue and Phthalocyanine Green, quinacridone based pigments, e.g., Quinacridone Red and Quinacridone Magenta, perylene based pigments, e.g., Perylene Red and Perylene Scarlet, isoindolinone based pigments, e.g., Isoindolinone Yellow and Isoindolinone Orange, imidazolone based pigments, e.g., Benzimidazolone Yellow, Benzimidazolone Orange, and Benzimidazolone Red, pyranthrone based pigments, e.g., Pyranthrone Red, and Pyranthrone Orange, indigo based pigments, condensed azo based pigments, thioindigo based pigments, diketo-pyrrolo-pyrrole based pigments, Flavanthrone Yellow, Acylamide Yellow, Quinophthalone Yellow, Nickel Azo Yellow, Copper Azomethine Yellow, Perinone Orange, Anthrone Orange, Dianthraquinonyl Red, and Dioxazine Violet.

Examples of organic pigments usable according to aspects of the present invention include, on a color index (C. I.) number basis, C. I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, and 185, C. I. Pigment Orange: 16, 36, 43, 51, 55, 59, 61, and 71, C. I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272, C. I. Pigment Violet: 19, 23, 29, 30, 32, 37, 40, and 50, C. I. Pigment Blue: 15, 15:1, 15:3, 15:4, 15:6, 22, 60, and 64, C. I. Pigment Green: 7 and 36, and C. I. Pigment Brown: 23, 25, and 26.

Regarding the ink according to aspects of the present invention, in the case where the pigment is used as the coloring material, any previously known system described below can be applied to a pigment dispersion system. Examples include polymer dispersion pigments by using polymer dispersing agents, microcapsule type pigments in which pigment particles are incorporated in the polymer substantially, polymer bonding type pigments in which organic groups containing a polymer are bonded to surfaces of pigment particles, and self-dispersing pigments in which hydrophilic groups are bonded to surfaces of pigment particles. As a matter of course, these pigments having different dispersion systems can be used in combination. In particular, among the plurality of coloring materials which have different hues and which constitute the ink according to aspects of the present invention, the major coloring material can be carbon black.

According to aspects of the present invention, as for the polymer dispersing agent to disperse the pigment into the ink and polymers added to the ink for the purpose of improving scratch resistance and the like of the recorded image, any polymer can be used insofar as the polymer has water solubility. Specific examples include copolymers in the form of block, random, graft, or the like and salts thereof synthesized from at least two monomers (at least one of them is a hydrophilic monomer) selected from the following monomers and derivatives thereof. Examples of monomers include styrene and derivatives thereof, vinyl naphthalene and derivatives thereof, aliphatic alcohol esters of $\alpha,\beta$-ethylenic unsaturated carboxylic acid, acrylic acid and derivatives thereof, maleic acid and derivatives thereof, itaconic acid and derivatives thereof, fumaric acid and derivatives thereof, vinyl acetate, vinyl pyrrolidone, and acrylamide. Furthermore, natural polymers, e.g., rosin, shellac, and starch, can also be used. The polymer to disperse the pigment can be an alkali-soluble polymer, that is, a polymer having an anionic group. The above-described polymer has a weight average molecular weight of preferably 1,000 or more, and 30,000 or less, and furthermore 3,000 or more, and 15,000 or less and the acid value thereof is preferably 50 mgKOH/g or more, and 300 mgKOH/g or less. The polymer content (percent by mass) in the ink is preferably 0.1 percent by mass or more, and 10.0 percent by mass or less with reference to the total mass of the ink.

Dye

As for the dye usable for the ink according to aspects of the present invention, any one of the following dyes can be used. Examples thereof include azo based black dyes which are complexes coordinating with polyvalent metals, e.g., Cr, Cu, Mn, Al, Zn, and Fe, and azo based black dyes which are not complexes, e.g., C. I. Direct Black: 17, 19, 51, 154, 174, and 195. Furthermore, examples thereof include C. I. Acid Yellow: 11, 17, 23, 25, 29, 42, 49, 61, and 71, C. I. Direct Yellow: 12, 24, 26, 44, 86, 87, 98, 100, 130, 132, and 142, C. I. Acid Red: 1, 6, 8, 32, 35, 37, 51, 52, 80, 85, 87, 92, 94, 115, 180, 254, 256, 289, 315, and 317, C. I. Direct Red: 1, 4, 13, 17, 23, 28, 31, 62, 79, 81, 83, 89, 227, 240, 242, and 243, C. I. Acid Blue: 9, 22, 40, 59, 93, 102, 104, 113, 117, 120, 167, 229, 234, and 254, and C. I. Direct Blue: 6, 22, 25, 71, 78, 86, 90, 106, and 199.

Aqueous Medium

The ink according to aspects of the present invention can contain an aqueous medium which is a mixed solvent of water and a water-soluble organic solvent. As for the water-soluble organic solvent, any one of solvents, e.g., monohydric or polyhydric alcohols, glycols, glycol ethers, and heterocyclic compounds, which have been used for ink-jet ink previously, can be used. The content (percent by mass) of the water-soluble organic solvent in the ink is preferably 3.0 percent by mass or more, and 50.0 percent by mass or less with reference to the total mass of the ink.

The water content (percent by mass) in the ink is preferably 50.0 percent by mass or more, and 95.0 percent by mass or less with reference to the total mass of the ink.

Other Components

The ink according to aspects of the present invention may contain water-soluble organic compounds, e.g., urea, urea derivatives, trimethylol propane, and trimethylol ethane, which are solid at ambient temperature, besides the above-described components. The content (percent by mass) of the water-soluble organic compounds, which are solid at ambient temperature, in the ink is preferably 0.1 percent by mass or more, and 20.0 percent by mass or less, and more preferably 3.0 percent by mass or more, and 10.0 percent by mass or less with reference to the total mass of the ink. Furthermore, as necessary, the ink according to aspects of the present invention may contain various additives, e.g., a pH regulator, a rust inhibitor, a fungicide, an antioxidant, and a reduction inhibitor, besides the above-described components.

Ink-Jet Recording Method

An ink-jet recording method according to aspects of the present invention includes the step of ejecting the above-described ink according to aspects of the present invention from an ink-jet method recording head to perform recording on a recording medium. The individual inks constituting the ink set according to aspects of the present invention, described later, can also be applied to the ink-jet recording method favorably. As for the ink-jet method, there is a system in which ink is ejected by applying thermal energy or mechanical energy to the ink. Regarding aspects of the present invention, in particular, the recoding method by using the thermal energy can be employed because more remarkable effects can be obtained. Known steps may be employed as the steps of the ink-jet recording method except that the ink according to aspects of the present invention is used. According to aspects of the present invention, the term "recording" includes the form in which recording is performed on a recording medium, e.g., a recording medium having an ink receiving layer and normal paper, and a form in which printing is performed on a nonpermeable recording medium, e.g., glass, plastic, and film.

Ink Cartridge

The ink cartridge according to aspects of the present invention includes an ink storage portion to store an ink, wherein the above-described ink according to aspects of the present invention is stored in the above-described ink storage portion. As for the structure of the ink cartridge, a structure in which the ink storage portion is formed from an ink containing chamber to store the ink in a space in the inside thereof and a negative pressure generation member-holding chamber to store a negative pressure generating member to hold the ink in the inside thereof through the use of a negative pressure generated by an absorber or the like is mentioned. Alternatively, the ink cartridge may include an ink storage portion which does not have the ink containing chamber to store the ink in a space in the inside thereof, but which is configured to hold the whole ink to be stored by the negative pressure generating member. Furthermore, a bag-shaped ink storage portion, which stores the ink by being provided with a force in the direction to expand the internal volume thereof with a spring member or the like, may be employed. A form in which the ink cartridge having these configurations is further integrated with a recording head may be employed.

Ink Set

The ink set according to aspects of the present invention is an ink set formed from a plurality of inks, wherein the above-described inks according to aspects of the present invention is included as at least one type of the above-described plurality of inks. According to aspects of the present invention, in particular, the ink set can be formed from a plurality of inks having different total contents of coloring materials, and each ink in the ink set has a color tone of black. For example, a monochromatic image excellent in gradation properties, graininess, and the like can be recorded by using the plurality of black inks having different total contents of coloring materials.

Hitherto, regarding the black ink, it is general recognition that the bronze phenomenon of the image recorded with an ink having a relatively small total content of coloring materials tends to become more remarkable because of low density and high reflectivity. However, according to the examination of the present inventors, an important issue was made apparent, that is, the bronze phenomenon in a shadow portion (black solid image), which was frequently recorded by the ink having a relatively large total content of coloring materials, degrades the blackness of the monochromatic image significantly. Therefore, among the plurality of ink constituting the ink set according to aspects of the present invention, the ink according to aspects of the present invention having the above-described configuration can be used as the ink having the largest total content of coloring materials.

Examples of combinations of coloring materials, which can be used in the ink having the largest total content of coloring materials and which can suppress the bronze phenomenon effectively, include those described below. That is, a combination of two types composed of carbon black (black pigment) and a green pigment, a combination of three types composed of carbon black (black pigment), a cyan pigment, and a yellow pigment, and the like are mentioned. The total content (percent by mass) of coloring materials in the ink having the largest total content of coloring materials is preferably 2.0 percent by mass or more, and 10.0 percent by mass or less with reference to the total mass of the ink. If the total content of coloring materials is less than 2.0 percent by mass, a monochromatic image excellent in blackness of the shadow portion (black solid portion) and gradation expression cannot be recorded in some cases. On the other hand, if the total content of coloring materials exceeds 10.0 percent by mass, the reliability, e.g., ejection stability of ink-jet method recording head, of the ink is not obtained sufficiently in some cases.

Meanwhile, the inks having total contents of coloring materials smaller than that of the ink having the largest total content of coloring materials (hereafter referred to as other inks) are frequently used for recording of a halftoning region from the viewpoint of highlight of the gray line. Since the image density in this region is low, it is advantageous to attach primary importance to the color rather than the suppression of bronze phenomenon in order to obtain the blackness. That is, the other inks can be inks in which primary importance is attached to a saturation reduction. Regarding the monochromatic image, the color tone of a warm tone or a cool tone may be required. If the color tone of the ink used for recording of a halftoning region takes on yellowish red, in recording a monochromatic image with a cool tone, it is necessary to apply much of a cyan based ink for correction to a recording medium. Consequently, issues, e.g., ink overflow, color tone variation due to fluctuation in the amount of ejection, and the like occur easily. From this point of view as well, the other inks can be inks with a neutral tone, that is, small saturation.

Examples of combinations of coloring materials, in which the total content of coloring materials is smaller than that of the ink having the largest total content of coloring materials, which can be applied to the other inks, and which can reduce the saturation effectively, include a combination of the carbon black (black pigment), a cyan pigment, and a magenta pigment. The ink set according to aspects of the present invention can contains at least one type of other ink including such a combination of coloring materials. In the case where these inks are assumed to be a medium density ink and a lower density ink in accordance with the content of the coloring materials, it is preferable that the contents of coloring materials in the individual inks are specified to be within the following ranges. The total content (percent by mass) of coloring materials in the medium density ink is preferably 1.0 percent by mass or more, and 2.0 percent by mass or less with reference to the total mass of the ink, and the total content (percent by mass) of coloring materials in the lower density ink is preferably 0.1 percent by mass or more, and 1.0 percent by mass or less with reference to the total mass of the ink.

As described above, the ink set according to aspects of the present invention is formed by combining a plurality of types of ink and, thereby, a monochromatic image exhibiting excellent blackness all over the gray line region and being capable of conforming to a wide color tone from a warm tone to a cool tone can be recorded.

EXAMPLES

Aspects of the present invention will be described below in further detail with reference to examples, reference examples, and comparative examples. However, the present invention is not limited to the following examples within the bounds of not departing from the gist thereof.

By the way, in the following description, the terms "part" and "%" are on a mass basis, unless otherwise specified.

Evaluation of Ink

Preparation of Pigment Dispersion

Each pigment dispersion was prepared by dispersing 15 parts of pigment, 5 parts of polymer dispersing agent, and 80 parts of water shown in Table 1 described below by using a sand mill (produced by KANEDA SCIENTIFIC CO., LTD.), in which the filling factor of zirconia beads having a diameter of 0.6 mm was specified to be 70%, at 1,500 rpm for 5 hours. As for the polymer dispersing agent, a styrene-acrylic acid copolymer having a copolymerization (mass) ratio of 60:40, a weight average molecular weight of 16,500, and an acid value of 240 mgKOH/g was used after being neutralized with sodium hydroxide equivalent to the acid value. As for the carbon black, MONARCH 1100 (produced by Cabot Corporation) was used. The content of the pigment in each of the resulting pigment dispersions was 15.0%.

TABLE 1

| Pigment species used for preparing pigment dispersion | |
|---|---|
| Type of pigment dispersion | Pigment species |
| Black pigment dispersion | Carbon black |
| Green pigment dispersion | C.I. Pigment Green 7 |
| Cyan pigment dispersion 1 | C.I. Pigment Blue 15:3 |
| Cyan pigment dispersion 2 | C.I. Pigment Blue 15:4 |
| Yellow pigment dispersion 1 | C.I. Pigment Yellow 74 |
| Yellow pigment dispersion 2 | C.I. Pigment Yellow 128 |
| Magenta pigment dispersion | C.I. Pigment Red 122 |
| Violet pigment dispersion | C.I. Pigment Violet 32 |

Preparation of Ink

The pigment dispersions obtained as described above were used, and Inks 1 to 7 of Examples and Comparative examples according to aspects of the present invention and the respective control inks in accordance with these Inks 1 to 7 were prepared. A polymer aqueous solution used for preparing the ink was an aqueous solution (polymer content 10.0%) produced by neutralizing the styrene-acryl copolymer having a copolymerization (mass) ratio of 70:30, a weight average molecular weight of 8,000, and an acid value of 160 mgKOH/g with sodium hydroxide equivalent to the acid value. A polyethylene glycol having an average molecular weight of 1,000 was used. Acetylenol E100 was a nonionic surfactant (produced by Kawaken Fine Chemicals Co., Ltd.).

Preparation of Inks 1 to 7

The individual components (unit: %) shown in Table 2 described below were mixed and agitated sufficiently. Thereafter, pressure filtration was performed with a filter (product name: HDCII; produced by Pall Corporation) having a pore size of 1.2 μm to prepare Inks 1 to 7. Inks 1 to 5 were inks of Examples satisfying the configuration according to aspects of the present invention, and Inks 6 and 7 were inks of Comparative examples not satisfying the requirements specified according to aspects of the present invention.

TABLE 2

Composition of ink (unit: %)

| Ink No. | 1 | 2 | 3 | 4 | 5 | 6 | 7 |
|---|---|---|---|---|---|---|---|
| Black pigment dispersion | 16.0 | 16.0 | 24.0 | 20.0 | | 10.0 | 4.8 |
| Green pigment dispersion | 2.6 | | | | | | 1.9 |
| Cyan pigment dispersion 1 | | 0.6 | | | 6.4 | | |
| Cyan pigment dispersion 2 | | | | | | 1.3 | |
| Yellow pigment dispersion 1 | | 2.0 | 20.0 | | 29.6 | | |
| Yellow pigment dispersion 2 | | | | 20.0 | | | |
| Magenta pigment dispersion | | | | | 22.2 | | 1.2 |
| Violet pigment dispersion | | | | | | 0.7 | |
| Polymer aqueous solution | 5.0 | 5.0 | 5.0 | 5.0 | 5.0 | 5.0 | 5.0 |
| Glycerin | 7.0 | 7.0 | 7.0 | 7.0 | 7.0 | 7.0 | 7.0 |
| 2-Pyrrolidone | 5.0 | 5.0 | 5.0 | 5.0 | 5.0 | 5.0 | 5.0 |
| Polyethylene glycol | 5.0 | 5.0 | 5.0 | 5.0 | 5.0 | 5.0 | 5.0 |
| Acetylenol E100 | 1.0 | 1.0 | 1.0 | 1.0 | 1.0 | 1.0 | 1.0 |
| Water | 58.4 | 58.4 | 33.0 | 37.0 | 18.8 | 65.0 | 69.1 |
| Remarks | Ink of invention | | | | | Ink of Comparative example | |

Preparation of Control Inks in Accordance with Inks 1 to 7

The individual components (unit: %) shown in Table 3-1 and Table 3-2 described below were mixed and agitated sufficiently. Thereafter, pressure filtration was performed with the filter (product name: HDCII; produced by Pall Corporation) having a pore size of 1.2 μm to prepare each control ink containing each coloring material in Inks 1 to 7.

TABLE 3-1

Composition of control ink (unit: %)

| Ink No. | 1 | | 2 | | | 3 | | 4 | | 5 | | |
|---|---|---|---|---|---|---|---|---|---|---|---|---|
| Control ink No. | 1a | 1b | 2a | 2b | 2c | 3a | 3b | 4a | 4b | 5a | 5b | 5c |
| Black pigment dispersion | 16.0 | | 16.0 | | | 24.0 | | 20.0 | | | | |
| Green pigment dispersion | | 2.6 | | | | | | | | | | |
| Cyan pigment dispersion 1 | | | | 0.6 | | | | | | | 6.4 | |
| Cyan pigment dispersion 2 | | | | | | | | | | | | |
| Yellow pigment dispersion 1 | | | | | 2.0 | | 20.0 | | | | | 29.6 |
| Yellow pigment dispersion 2 | | | | | | | | | 20.0 | | | |
| Magenta pigment dispersion | | | | | | | | | | | | 22.2 |
| Violet pigment dispersion | | | | | | | | | | | | |

TABLE 3-1-continued

Composition of control ink (unit: %)

| | Ink No. | | | | | | | | | | | |
|---|---|---|---|---|---|---|---|---|---|---|---|---|
| | 1 | | 2 | | | 3 | | 4 | | 5 | | |
| | Control ink No. | | | | | | | | | | | |
| | 1a | 1b | 2a | 2b | 2c | 3a | 3b | 4a | 4b | 5a | 5b | 5c |
| Polymer aqueous solution | 5.0 | 5.0 | 5.0 | 5.0 | 5.0 | 5.0 | 5.0 | 5.0 | 5.0 | 5.0 | 5.0 | 5.0 |
| Glycerin | 7.0 | 7.0 | 7.0 | 7.0 | 7.0 | 7.0 | 7.0 | 7.0 | 7.0 | 7.0 | 7.0 | 7.0 |
| 2-Pyrrolidone | 5.0 | 5.0 | 5.0 | 5.0 | 5.0 | 5.0 | 5.0 | 5.0 | 5.0 | 5.0 | 5.0 | 5.0 |
| Polyethylene glycol | 5.0 | 5.0 | 5.0 | 5.0 | 5.0 | 5.0 | 5.0 | 5.0 | 5.0 | 5.0 | 5.0 | 5.0 |
| Acetylenol E100 | 1.0 | 1.0 | 1.0 | 1.0 | 1.0 | 1.0 | 1.0 | 1.0 | 1.0 | 1.0 | 1.0 | 1.0 |
| Water | 61.0 | 74.4 | 61.0 | 76.4 | 75.0 | 53.0 | 57.0 | 57.0 | 57.0 | 70.6 | 47.4 | 54.8 |

TABLE 3-2

Composition of control ink (unit: %)

| | Ink No. | | | | | |
|---|---|---|---|---|---|---|
| | 6 | | | 7 | | |
| | Control ink No. | | | | | |
| | 6a | 6b | 6c | 7a | 7b | 7c |
| Black pigment dispersion | 10.0 | | | 4.8 | | |
| Green pigment dispersion | | | | | 1.9 | |
| Cyan pigment dispersion 1 | | | | | | |
| Cyan pigment dispersion 2 | | 1.3 | | | | |
| Yellow pigment dispersion 1 | | | | | | |
| Yellow pigment dispersion 2 | | | | | | |
| Magenta pigment dispersion | | | | | | 1.2 |
| Violet pigment dispersion | | | 0.7 | | | |
| Polymer aqueous solution | 5.0 | 5.0 | 5.0 | 5.0 | 5.0 | 5.0 |
| Glycerin | 7.0 | 7.0 | 7.0 | 7.0 | 7.0 | 7.0 |
| 2-Pyrrolidone | 5.0 | 5.0 | 5.0 | 5.0 | 5.0 | 5.0 |
| Polyethylene glycol | 5.0 | 5.0 | 5.0 | 5.0 | 5.0 | 5.0 |
| Acetylenol E100 | 1.0 | 1.0 | 1.0 | 1.0 | 1.0 | 1.0 |
| Water | 67.0 | 75.7 | 76.3 | 72.2 | 75.1 | 75.8 |

Evaluation

Each of the inks of Examples and Comparative examples obtained as described above and each of the control inks in accordance with the individual inks was filled in an ink cartridge. The ink cartridge was set at the position of a cyan ink in an ink-jet recoding apparatus (trade name: BJF900; produced by CANON KABUSHIKI KAISHA). Each of solid images with recording duties of 100% and 200% was recorded on a recording medium (Premium glossy paper (thick); produced by CANON KABUSHIKI KAISHA) through 8-pass two-way recording, so that a "predetermined image" recorded material formed from each ink or each control ink was obtained. In this regard, the 20-degree gloss value of the above-described recording medium, measured by using a microhazemeter (produced by BYK-Gardner) under the condition of the incident angle of 20 degrees and the reflection angle of 20 degrees, was 40.1.

The "predetermined image" obtained as described above was dried by standing at room temperature for one day, so that a recorded material for measurement was produced. The measurement of the recorded material concerned was performed by using Gonio-Spectrophotometric Color measurement system (Model GCMS-3B; produced by MURAKAMI COLOR RESEARCH LABORATORY) under the condition of the light source of D65, the view angle of 2 degrees, the incident angle of 45 degrees, the reflection angle of 45 degrees, the flapping angle of 0 degrees, and the in-plane rotation angle of 0 degrees. The tristimulus value of the illumination light was obtained by measuring a barium sulfate plate under the same condition. Then, the bronze value B and the saturation value C were calculated from the resulting values on the basis of Formula 1 and Formula 2 described above. Furthermore, each recorded material was observed visually and the bronze resistance and the saturation were evaluated on the basis of the following individual evaluation criteria. The results are shown in Tables 4 and 5.

Evaluation Criteria of Bronze Resistance

A: The bronze value B was 2.0 or less, and with respect to all recording duties, the bronze phenomenon was hardly recognized and excellent blackness was exhibited.

B: With respect to at least a part of recording duties, the bronze value B exceeded 2.0, the bronze phenomenon was recognized, the blackness was poor, and the level was unacceptable.

Evaluation Criteria of Saturation

A: The saturation value C was 2.0 or less, an achromatic color was recognized, and excellent blackness was exhibited.

B: With respect to at least a part of recording duties, the saturation value C was more than 2.0, and 4.0 or less, the blackness was somewhat poor, but the level was acceptable.

C: With respect to at least a part of recording duties, the saturation value C exceeded 4.0, the blackness was poor, and the level was unacceptable.

TABLE 4

Evaluation result of ink

| | | | Example | | | | | | | | | | |
|---|---|---|---|---|---|---|---|---|---|---|---|---|---|
| | | | 1 | | 2 | | 3 | | 4 | | 5 | | |
| Bronze resistance | Bronze value B | Ink No. | 1 | | 2 | | 3 | | 4 | | 5 | | |
| | | Recording duty 100% | 1.47 | | 1.41 | | 1.81 | | 1.95 | | 1.78 | | |
| | | Recording duty 200% | 1.35 | | 1.51 | | 1.67 | | 1.85 | | 1.55 | | |
| | | Control ink No. | 1a | 1b | 2a | 2b | 2c | 3a | 3b | 4a | 4b | 5a | 5b | 5c |
| | | Recording duty 100% | 2.62 | 7.63 | 2.62 | 23.6 | 4.19 | 1.90 | 1.68 | 2.14 | 5.29 | 18.01 | 2.49 | 7.51 |
| | | Recording duty 200% | 1.65 | 6.79 | 1.65 | 17.86 | 2.58 | 1.59 | 1.90 | 1.74 | 7.22 | 17.43 | 2.20 | 7.64 |
| | | Evaluation result | A | | A | | A | | A | | A | | |
| Saturation | Saturation value C | Recording duty 100% | 0.92 | | 1.26 | | 1.86 | | 2.11 | | 0.50 | | |
| | | Recording duty 200% | 0.25 | | 0.47 | | 0.20 | | 0.43 | | 0.38 | | |
| | | Evaluation result | A | | A | | A | | B | | A | | |

TABLE 5

Evaluation result of ink

| | | | Comparative example | | | | | | |
|---|---|---|---|---|---|---|---|---|---|
| | | | 1 | | | 2 | | | |
| Bronze resistance | Bronze value B | Ink No. | 6 | | | 7 | | | |
| | | Recording duty 100% | 3.78 | | | 4.30 | | | |
| | | Recording duty 200% | 3.61 | | | 4.55 | | | |
| | | Control ink No. | 6a | 6b | 6c | 7a | 7b | 7c | |
| | | Recording duty 100% | 2.87 | 13.54 | 21.8 | 3.10 | 9.63 | 14.2 | |
| | | Recording duty 200% | 1.83 | 14.63 | 21.8 | 2.02 | 8.80 | 14.4 | |
| | | Evaluation result | B | | | B | | | |
| Saturation | Saturation value C | Recording duty 100% | 0.52 | | | 0.78 | | | |
| | | Recording duty 200% | 0.47 | | | 0.92 | | | |
| | | Evaluation result | A | | | A | | | |

Evaluation of ink set

Preparation of ink

The individual components (unit: %) shown in Table 6 described below were mixed and agitated sufficiently. Thereafter, pressure filtration was performed with a filter (product name: HDCII; produced by Pall Corporation) having a pore size of 1.2 μm to prepare each ink used for an ink set. As for a polymer aqueous solution, an aqueous solution (polymer content 10.0%) produced by neutralizing the styrene-acryl copolymer having a copolymerization (mass) ratio of 70:30, a weight average molecular weight of 8,000, and an acid value of 160 mgKOH/g with sodium hydroxide equivalent to the acid value was used. A polyethylene glycol having an average molecular weight of 1,000 was used. Acetylenol E100 was a nonionic surfactant (produced by Kawaken Fine Chemicals Co., Ltd.).

TABLE 6

Composition of ink used for ink set (unit: %)

| | Ink No. | | | |
|---|---|---|---|---|
| | 8 | 9 | 10 | 11 |
| Carbon black dispersion | 6.3 | 3.0 | 2.4 | 1.3 |
| Green pigment dispersion | | | 1.0 | 0.6 |
| Cyan pigment dispersion 1 | 1.8 | 0.9 | | |
| Magenta pigment dispersion | 2.7 | 1.3 | 0.6 | 0.3 |
| Polymer aqueous solution | 5.0 | 5.0 | 5.0 | 5.0 |
| Glycerin | 7.0 | 7.0 | 7.0 | 7.0 |
| 2-Pyrrolidone | 5.0 | 5.0 | 5.0 | 5.0 |
| Polyethylene glycol | 5.0 | 5.0 | 5.0 | 5.0 |
| Acetylenol E100 | 1.0 | 1.0 | 1.0 | 1.0 |
| Water | 66.2 | 71.8 | 73.0 | 74.8 |

Each of Inks 1, 2, 6, and 8 to 11 obtained as described above was filled in an ink cartridge. The combination shown in Table 7 described below was employed, and the individual inks were set at the positions of cyan, magenta, and yellow, in decreasing order of total content of coloring materials in the ink, in an ink-jet recoding apparatus (trade name: BJF900; produced by CANON KABUSHIKI KAISHA).

TABLE 7

Configuration and set position of ink set

| | Example | | Comparative example |
|---|---|---|---|
| | 6 | 7 | 3 |
| Position of cyan ink | Ink 1 | Ink 2 | Ink 6 |
| Position of magenta ink | Ink 8 | Ink 8 | Ink 10 |
| Position of yellow ink | Ink 9 | Ink 9 | Ink 11 |

Evaluation

Subsequently, this ink-jet recoding apparatus was used, each image was recorded on Premium glossy paper (thick) (produced by CANON KABUSHIKI KAISHA) through 8-pass two-way recording while the recording duty of each ink was specified to be as shown in Table 8. Therefore, the image density of Image 1 was the highest, and the image density decreases in the order of Image 2, Image 3, Image 4, and Image 5.

TABLE 8

Set position and recording duty of each ink

| | Image No. | | | | |
|---|---|---|---|---|---|
| | 1 | 2 | 3 | 4 | 5 |
| Position of cyan ink | 200% | 87.5% | | | |
| Position of magenta ink | | 87.5% | 150% | 62.5% | |
| Position of yellow ink | | | | 62.5% | 100% |

Each of the resulting recorded materials was dried by standing at room temperature for one day and, thereafter, the bronze value B and the saturation value C of each image were calculated under the same apparatus and condition as those in Examples. The results are shown in Table 9.

TABLE 9

Measurement result of ink set

| | | Example | | Comparative example |
|---|---|---|---|---|
| | | 6 | 7 | 3 |
| Bronze value B | Image 1 | 1.35 | 1.51 | 4.55 |
| | Image 2 | 2.39 | 2.34 | 4.60 |
| | Image 3 | 3.05 | 3.05 | 4.63 |
| | Image 4 | 3.61 | 3.61 | 4.30 |
| | Image 5 | 4.21 | 4.21 | 4.13 |
| | Maximum value | 4.21 | 4.21 | 4.63 |
| Saturation value C | Image 1 | 0.25 | 0.47 | 0.92 |
| | Image 2 | 0.74 | 0.93 | 3.16 |
| | Image 3 | 0.68 | 0.68 | 5.69 |
| | Image 4 | 0.84 | 0.84 | 3.43 |
| | Image 5 | 1.03 | 1.03 | 1.10 |
| | Maximum value | 1.03 | 1.03 | 5.69 |

The blackness of each image recorded by each of the individual inks constituting the ink set was evaluated on the basis of the bronze value B and the saturation value C obtained as described above and on the basis of the evaluation criteria described below. The results are shown in Table 10. According to aspects of the present invention, regarding the following evaluation items (1) to (3), the rank C was assumed to be at an unacceptable level.

(1) Bronze value B at the maximum image density (Image 1)
A: The bronze value B at the maximum image density was 2.0 or less.
B: The bronze value B at the maximum image density was more than 2.0, and 4.0 or less.
C: The bronze value B at the maximum image density exceeded 4.0.

(2) Maximum value of bronze value B
A: The maximum value of the bronze value B was 5.0 or less.
B: The maximum value of the bronze value B was more than 5.0, and 7.5 or less.
C: The maximum value of the bronze value B exceeded 7.5.

(3) Maximum value of saturation value C
A: The maximum value of the saturation value C was 3.0 or less.
B: The maximum value of the saturation value C was more than 3.0, and 5.0 or less.
C: The maximum value of the saturation value C exceeded 5.0.

TABLE 10

Evaluation result of ink set

| | Example | | Comparative example |
|---|---|---|---|
| | 6 | 7 | 3 |
| Bronze value B at maximum image density | A | A | C |
| Maximum value of bronze value B | A | A | A |
| Maximum value of saturation value C | A | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-017789 filed Jan. 29, 2010, which is hereby incorporated by reference herein in its entirety.

What is claimed is:

1. An inkjet recording method comprising the step of ejecting an ink from an ink-jet recording head to perform recording on a recording medium, wherein an ink comprises a plurality of coloring materials having different hues, the plurality of coloring materials including a pigment,
wherein the bronze value B, which is calculated by Formula 1 described below, with respect to a predetermined recorded image recorded by the ink is 2.0 or less, $$a_{45}^* = 500\left[f\left(\frac{Xx_{45}}{Xs_{45}}\right) - f\left(\frac{Yx_{45}}{Ys_{45}}\right)\right], \quad \text{Formula 1}$$

$$b_{45}^* = 200\left[f\left(\frac{Yx_{45}}{Ys_{45}}\right) - f\left(\frac{Zx_{45}}{Zs_{45}}\right)\right]$$

$$B = (a_{45}^{*2} + b_{45}^{*2})^{\frac{1}{2}}$$

wherein $Xx_{45}$, $Yx_{45}$, and $Zx_{45}$ are tristimulus values of reflected light of illumination in the direction of specular reflection, the illumination is in the direction of an angle of 45 degrees to a normal to the image, $Xs_{45}$, $Ys_{45}$, and $Zs_{45}$ are tristimulus values of illumination light under the same condition of the illumination, and these tristimulus values satisfy the following formulas:

$$f\left(\frac{Xx_{45}}{Xs_{45}}\right) = \left(\frac{Xx_{45}}{Xs_{45}}\right)^{\frac{1}{3}} \text{ where } \frac{Xx_{45}}{Xs_{45}} > 0.008856$$

$$f\left(\frac{Xx_{45}}{Xs_{45}}\right) = 7.78\frac{Xx_{45}}{Xs_{45}} + \frac{16}{116} \text{ where } \frac{Xx_{45}}{Xs_{45}} \leq 0.008856$$

$$f\left(\frac{Yx_{45}}{Ys_{45}}\right) = \left(\frac{Yx_{45}}{Ys_{45}}\right)^{\frac{1}{3}} \text{ where } \frac{Yx_{45}}{Ys_{45}} > 0.008856$$

$$f\left(\frac{Yx_{45}}{Ys_{45}}\right) = 7.78\frac{Yx_{45}}{Ys_{45}} + \frac{16}{116} \text{ where } \frac{Yx_{45}}{Ys_{45}} \leq 0.008856$$

$$f\left(\frac{Zx_{45}}{Zs_{45}}\right) = \left(\frac{Zx_{45}}{Zs_{45}}\right)^{\frac{1}{3}} \text{ where } \frac{Zx_{45}}{Zs_{45}} > 0.008856$$

$$f\left(\frac{Zx_{45}}{Zs_{45}}\right) = 7.78\frac{Zx_{45}}{Zs_{45}} + \frac{16}{116} \text{ where } \frac{Zx_{45}}{Zs_{45}} \leq 0.008856.$$

2. The ink-jet recording method according to claim 1, wherein the saturation value C, which is calculated by Formula 2 described below, with respect to the predetermined recorded image recorded by the ink is 2.0 or less, $$a_0^* = 500\left[f\left(\frac{Xx_0}{Xs_0}\right) - f\left(\frac{Yx_0}{Ys_0}\right)\right], \quad \text{Formula 2}$$

$$b_0^* = 200\left[f\left(\frac{Yx_0}{Ys_0}\right) - f\left(\frac{Zx_0}{Zs_0}\right)\right]$$

$$C = (a_0^{*2} + b_0^{*2})^{\frac{1}{2}}$$

wherein $Xx_0$, $Yx_0$, and $Zx_0$ are tristimulus values of reflected light of illumination in the direction of a normal to the image, the illumination is in the direction of an angle of 45 degrees to the normal, $Xs_0$, $Ys_0$, and $Zs_0$ are tristimulus values of illumination light under the same condition of the illumination, and these tristimulus values satisfy the following formulas:

$$f\left(\frac{Xx_0}{Xs_0}\right) = \left(\frac{Xx_0}{Xs_0}\right)^{\frac{1}{3}} \text{ where } \frac{Xx_0}{Xs_0} > 0.008856$$

$$f\left(\frac{Xx_0}{Xs_0}\right) = 7.78\frac{Xx_0}{Xs_0} + \frac{16}{116} \text{ where } \frac{Xx_0}{Xs_0} \leq 0.008856$$

$$f\left(\frac{Yx_0}{Ys_0}\right) = \left(\frac{Yx_0}{Ys_0}\right)^{\frac{1}{3}} \text{ where } \frac{Yx_0}{Ys_0} > 0.008856$$

$$f\left(\frac{Yx_0}{Ys_0}\right) = 7.78\frac{Yx_0}{Ys_0} + \frac{16}{116} \text{ where } \frac{Yx_0}{Ys_0} \leq 0.008856$$

$$f\left(\frac{Zx_0}{Zs_0}\right) = \left(\frac{Zx_0}{Zs_0}\right)^{\frac{1}{3}} \text{ where } \frac{Zx_0}{Zs_0} > 0.008856$$

$$f\left(\frac{Zx_0}{Zs_0}\right) = 7.78\frac{Zx_0}{Zs_0} + \frac{16}{116} \text{ where } \frac{Zx_0}{Zs_0} \leq 0.008856.$$

3. The ink-jet recording method according to claim 1, wherein among the plurality of coloring materials having different hues, the coloring material having the largest content in the ink is carbon black.

4. The ink-jet recording method according to claim 3, wherein the mass ratio of the content of carbon black in the ink to the total content of coloring materials other than carbon black is within the range of 7:1 to 1:1.

5. The ink-jet recording method according to claim 1, wherein all the plurality of coloring materials having different hues are pigments,
wherein the coloring material having the largest content in the ink is carbon black, and
wherein the total content of the coloring materials in the ink of 2.0 percent by mass or more and 10.0 percent by mass or less with reference of the total mass of the ink.

6. The ink-jet recording method according to claim 1, wherein the plurality of coloring materials having different hues comprises carbon black and at least one pigment selected from the group consisting of C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, and 185, C.I. Pigment Orange: 16, 36, 43, 51, 55, 59, 61, and 71, C.I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272, C.I. Pigment Violet: 19, 23, 29, 30, 32, 37, 40, and 50, C.I. Pigment Blue: 15, 15:1, 15:3, 15:4, 15:6, 22, 60, and 64, C.I. Pigment Green: 7 and 36, and C.I. Pigment Brown: 23, 25, and 26.

7. The ink-jet recording method according to claim 1, wherein the plurality of coloring materials having different hues comprises carbon black and at least one pigment selected from the group consisting of C.I. Pigment Green 7, C.I. Pigment Blue 15:3, C.I. Pigment Blue 15:4, C.I. Pigment Yellow 74, C.I. Pigment Yellow 128 and C.I. Pigment Red 122.

\* \* \* \* \*